US012572646B2

(12) United States Patent
Coulon et al.

(10) Patent No.: US 12,572,646 B2
(45) Date of Patent: Mar. 10, 2026

(54) EXECUTION PROTECTION USING DATA COLOURING

(71) Applicant: THALES DIS FRANCE SAS, Meudon (FR)

(72) Inventors: Jean Roch Coulon, Le Tholonet (FR); André Sintzoff, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 67 days.

(21) Appl. No.: 18/037,390

(22) PCT Filed: Nov. 8, 2021

(86) PCT No.: PCT/EP2021/080882
§ 371 (c)(1),
(2) Date: May 17, 2023

(87) PCT Pub. No.: WO2022/106228
PCT Pub. Date: May 27, 2022

(65) Prior Publication Data
US 2024/0004991 A1     Jan. 4, 2024

(30) Foreign Application Priority Data
Nov. 18, 2020     (EP) ..................................... 20306400

(51) Int. Cl.
*G06F 21/54*          (2013.01)
*G06F 21/52*          (2013.01)
*G06F 21/55*          (2013.01)
(52) U.S. Cl.
CPC .............. *G06F 21/54* (2013.01); *G06F 21/52* (2013.01); *G06F 21/554* (2013.01)
(58) Field of Classification Search
CPC ......... G06F 21/54; G06F 21/52; G06F 21/554
See application file for complete search history.

(56) References Cited

U.S. PATENT DOCUMENTS

| | | | | |
|---|---|---|---|---|
| 2018/0181499 A1* | 6/2018 | Branco | ................. | H04L 9/0662 |
| 2019/0042799 A1* | 2/2019 | Durham | ................. | G06F 21/64 |
| 2019/0243655 A1 | 8/2019 | Milburn et al. | | |

FOREIGN PATENT DOCUMENTS

| | | | | |
|---|---|---|---|---|
| WO | 2019152805 A1 | 8/2019 | | |
| WO | WO-2020128413 A1 * | 6/2020 | ............. | G06F 21/57 |

OTHER PUBLICATIONS

Lloyd, D.W. • Garside, J.D. • Gilbert, D.A.; Memory faults in asynchronous microprocessors; Proceedings. Fifth International Symposium on Advanced Research in Asynchronous Circuits and Systems (1999, pp. 71-80); (Year: 1999).*

(Continued)

*Primary Examiner* — Jahangir Kabir
*Assistant Examiner* — Chao Wang

(57)                ABSTRACT

Provided is a system for execution protection using data colouring. The system includes a central processing unit (CPU), a system memory (SM) and a secure agent component (SAC). The SAC monitors memory access instructions occurring between the CPU and SM. The SAC comprises a colour memory (CM) storing a colour tag for each memory address of the system memory (SM). The SAC stores instructions at a destination address, and copies the colour tag stored at the instruction address in the colour memory to the destination address in the colour memory (CM) while storing data. The SAC loads instruction at a retrieval address, and compares the colour tag stored at the retrieval address and the colour tag at the load instruction in the colour memory (CM). A dysfunction is detected if colour tags are different. Other embodiments disclosed.

8 Claims, 3 Drawing Sheets

(56) References Cited

OTHER PUBLICATIONS

Erdem Aktas • Furat Afram • Kanad Ghose; Continuous, Low Overhead, Run-Time Validation of Program Executions; 2014 47th Annual IEEE/ACM International Symposium on Microarchitecture (2014, pp. 229-241); (Year: 2014).*

Zhaoxiang Jin • Soner Onder; Dynamic Memory Dependence Predication; 2018 ACM/IEEE 45th Annual International Symposium on Computer Architecture (ISCA) (2018, pp. 235-246); (Year: 2018).*

International Search Report and Written Opinion mailed on Feb. 8, 2022 for corresponding International Application PCT/US2021/080882 (15 pages).

Dongkyun Ahn et al: "Prospect of Fine Grain Dynamic Memory Access Control with Profiling", Emerging Security Information Systems and Technologies (Securware), 2010 Fourth International Conference on, IEEE, Piscataway, NJ, USA, Jul. 18, 2010 (Jul. 18, 2010), pp. 69-74, XP031799911, ISBN: 978-1-4244-7517-9—the whole document.

* cited by examiner

EXECUTION PROTECTION USING DATA COLOURING

FIELD OF THE INVENTION

The present invention relates to an execution system having at least a central processing unit, a system memory storing a genuine program having instructions and associated variables at determined addresses and a secure agent component dedicated to the protection of the execution of the genuine program and fetching instructions occurring between the central processing unit and memories.

The invention also pertains to a method to protect the execution of a genuine program having instructions stored in a system memory at determined addresses, said genuine program being to be executed by a central processing unit using said system memory, said method being implemented, independently of the execution of the genuine program, thanks to a secure agent component inserted between the system memory and the central processing unit.

BACKGROUND OF THE INVENTION

The invention concerns products with security needs. It is well known that any CPU-based products including security ones as smartcard are facing attacks such as buffer overflow (/underflow) including stack overflow (/underflow), Java Program Counter (JPC) and Java Stack Pointer (JSP) attacks.

State-of-the-art counter measures as software bound checking, canary or double stack targets only a part of the Address range protection with penalty in performance or code development.

Further alternative and advantageous solutions would, accordingly, be desirable in the art.

SUMMARY OF THE INVENTION

The present invention aims at detecting the above-mentioned malicious attacks while not harming the performance of a genuine program.

The present invention is defined, in its broadest sense, as an execution system, according to claim 1, having at least a central processing unit, a system memory storing a genuine program having instructions and associated variables at determined addresses and a secure agent component dedicated to the protection of the execution of the genuine program and fetching instructions occurring between the central processing unit and memories, said secure agent component comprising a colour memory created at the compilation time of the genuine program from the genuine program source and data to be protected, said colour memory listing the determined memory addresses of the genuine program with, at least, an associated colour tag for each store and load instruction relative to data to be protected, said secure agent component being such that, for store instruction of a data to be protected at a destination address of the system memory, it associates the colour tag stored at the store instruction address in the colour memory to the destination address in the colour memory while storing data at the destination address in the system memory, said secure agent component being further such that, for load instruction at a loading address, it compares the colour tag associated to the loading address in the colour memory and the colour tag associated to the load instruction address in the colour memory, said secure agent component detecting a dysfunction and raising an alarm if the compared colour tags are different.

With the invention, when a memory access instruction, e.g. load, store, is fetched from a system memory where the genuine program is stored, a secure agent component of the invention loads a corresponding colour tag from a colour memory. This tag is used in the following way:

1) for store instruction, the colour tag is copied in the colour memory corresponding to the destination address.

2) for load instruction, the instruction colour tag is compared to the data colour tag, written previously during a store instruction into the colour memory at the data address. If the tags are different, an attack is detected.

The creation of the colour memory is indeed based on the list of addresses in the genuine program, the list of data to be protected and the colour tags associated to these data. Indeed the colour memory reproduces the list of addresses of the genuine program with colours tags stored at the addresses of data to be protected and at the address of the instructions manipulating it.

The invention thus proposes a data colouring with address checker, which is a global security solution with no performance impact. Indeed, with the invention, the genuine program is executed without consideration of the processing by the secure agent component which performs tasks in parallel of the execution of the genuine program.

Furthermore, the implementation of the invention is simpler than current counter measures. The invention can replace the Memory Protection Unit (MPU) functionality with better granularity. It is a global counter measure solution which targets several attacks: stack, buffer and variable attacks. . . . The invention is new and original in comparison with state-of-the-art counter measures based on MPU, redundancy introduced by the software or canary inserted in stack.

It is here noted that the genuine program designates any kind of program which was not modified substantially by the implementation of the protection of the invention. "Genuine" means here that no modification were introduced in the program itself for the need of the invention.

It is here noted that, even if the colour memory can be implemented in the system memory besides the genuine program itself as it will be described later in the specification of the drawings, the central processing unit will only considers the instructions of the genuine program itself and no modifications in the execution of the program are introduced by the invention.

The genuine program can thus be any program having a certification or a specific compliance, necessitating no modification. It can also be an open source program.

The invention indeed permits to protect the execution of the genuine program without introducing any modification in the genuine program which remains devoid of any modification for the need of the invention.

It is also further here noted that the system memory can be a cache as it will be discussed in the description of the drawings.

According to a first implementation, the secure agent component being such that, for store instruction of a data to be protected at a destination address of the system memory, it associates the colour tag stored at the store instruction address in the colour memory to the destination address in the colour memory while storing data at the destination in the system memory by copying the colour tag stored at the store instruction address in the colour memory to the destination address in the colour memory while storing data at the destination address in the system memory, and wherein, for load instruction of a data to be protected at a loading address of the system memory, it compares the colour tag associated to the loading address in the colour memory and the colour tag associated to the load instruction address in the colour memory by a comparison of the colour tags stored at the loading address in the colour memory and stored at the load instruction address in the colour memory.

According to a second implementation, the secure agent component being such that, for store instruction of a data to be protected at a destination address of the system memory, it associates the colour tag stored at the store instruction address in the colour memory to the destination address in the colour memory while storing data at the destination in the system memory by:

retrieving the colour tag stored at the store instruction address in the colour memory, calculating an integrity function of the retrieved colour tag and of the data to be stored according to the store instruction as a coloured integrity tag, storing the thus calculated coloured integrity tag at the destination address in the colour memory while storing the data at the destination address in the system memory, the association of the colour tag with the data to be protected being thus realized through the thus calculated and stored coloured integrity tag, and wherein, for load instruction of a data to be protected at a loading address of the system memory, it compares the colour tag associated to the loading address in the colour memory and the colour tag at the load instruction address in the colour memory by:

retrieving the colour tag stored at the load instruction address in the colour memory, calculating an integrity function of the thus retrieved colour tag and of the data to be loaded according to the load instruction as an integrity value, the comparison step being a comparison of the thus calculated coloured integrity tag with the coloured integrity tag as stored at the loading address in the colour memory.

According to a feature of the invention, the colours associated to data to be protected have been defined by user inputs relative to the data to be protected used at the time of compilation during the creation of the colour memory.

According to an advantageous feature, said colour memory created at the compilation time listing the determined memory addresses of the genuine program with, in addition, an associated colour tag for each determined addresses where the data to be protected are stored, said execution system being such that, for any load instruction of such data to be protected at the determined address of the system memory, the execution system compares the colour tag stored at the loading address in the colour memory and the colour tag at the load instruction address in the colour memory.

The invention also relates to a method to protect the execution of a genuine program having instructions stored in a system memory at determined addresses, said genuine program being to be executed by a central processing unit using said system memory, said method being implemented, independently of the execution of the genuine program, thanks to a secure agent component inserted between the system memory and the central processing unit, said secure agent component comprising a colour memory created at the compilation time of the genuine program from the genuine program source and from data to be protected, said colour memory listing the determined memory addresses of the genuine program with, at least, an associated colour tag for each store and load instruction relative to data to be protected, the method to protect the execution of the program comprising the steps of:

for the secure agent component, during the execution of the genuine program by the central processing unit, fetching instructions between the central processing unit and the system memory, for store instruction of a data to be protected at a destination address of the system memory, associating the colour tag stored at the store instruction address in the colour memory to the destination address in the colour memory while storing data to the destination address in the system memory, for load instruction of a data to be protected at a loading address of the system memory, comparing the colour tag associated to the loading address in the colour memory and the colour tag associated to the load instruction address in the colour memory, in case those compared colour tags are different, detecting a dysfunction and raising an alarm.

Such a method is implemented in a system as defined according to the invention. While having, in the colour memory, a kind of duplicate of the addresses as stored in the system memory, said duplicate giving colours associated to addresses, the method of the invention enables a double check of the address and of the colouring of the data. In case of fault attack or other attacks modifying memory in a way that does not correspond to the genuine program, the invention enables to find discrepancies.

According to a first implementation of the invention, the step of, for store instruction of a data to be protected at a destination address of the system memory, associating the colour tag stored at the store instruction address in the colour memory to the destination address in the colour memory while storing data at the destination in the system memory consists in copying the colour tag stored at the store instruction address in the colour memory to the destination address in the colour memory while storing data at the destination address in the system memory, and the step of, for load instruction of a data to be protected at a loading address of the system memory, comparing the colour tag associated to the loading address in the colour memory and the colour tag associated to the load instruction address in the colour memory is a comparison of the colour tags stored at the loading address in the colour memory and stored at the load instruction address in the colour memory.

This implementation enables to check that the right loading address has been designated by the program and that no fault has been introduced for the memory access instruction to point to another address than the right one. This is a simple implementation where the comparison is direct from the colour tags as directly previously stored.

According to a second implementation of the invention, the step of, for store instruction of a data to be protected at a destination address of the system memory, associating the colour tag stored at the store instruction address in the colour memory to the destination address in the colour memory while storing data at the destination in the system memory consists in the following steps:

retrieving the colour tag stored at the store instruction
address in the colour memory, calculating an integrity function of the retrieved colour
tag and of the data to be stored according to the store
instruction as a coloured integrity tag, storing the thus calculated coloured integrity tag at the
destination address in the colour memory while storing
the data at the destination address in the system
memory, the association of the colour tag with the data
to be protected being thus realized through the thus
calculated and stored coloured integrity tag and the step of, for load instruction of a data to be
protected at a loading address of the system memory,
comparing the colour tag associated to the loading
address in the colour memory and the colour tag at the
load instruction address in the colour memory consists
in the following steps:

retrieving the colour tag stored at the load instruction
address in the colour memory, calculating an integrity function of the thus retrieved
colour tag and of the data to be loaded according to
the load instruction as a coloured integrity tag, the comparison step being a comparison of the thus
calculated coloured integrity tag with the coloured
integrity tag as stored at the loading address in the
colour memory.

This second implementation is an indirect comparison of
a colour tag associated to the loading address in the colour
memory and a colour tag associated to the load instruction
address in the colour memory. This uses a data integrity
functionality to verify the address range. The coloured
integrity tag of this implementation combines a colour tag as
previously defined with a signature of the data.

With such improvement, the system is modified in the
following way:

1) for store instruction, the coloured integrity tag is
generated from data and colour tag and copied in the
colour memory corresponding to the destination
address.

2) for load instruction, the integrity of the loaded data is
computed using the load instruction colour tag and the
data itself. If the coloured integrity tag is different with
the computed coloured integrity tag, an attack is
detected. Thus, the invention enables to check the
integrity of the value while the data is loaded. It is
particularly valuable when the value of the data to be
protected can change. Here, referring to the wording of
claim 1, the association of the colour tag as claimed in
claim 1 consists to associate an integrity value calcu-
lated from the colour tag as defined according to the
invention, among other, i.e. the value of the data. This
saves space in memory to be able to store a single
coloured integrity value enabling to check the integrity
and the colour of the data. The coloured integrity tag
stored in the colour memory for a data to be protected
is an integrity value obtained from a combination of the
data and of the colour tag as associated to instructions
manipulating the data to be protected.

According to a particular feature of the invention, the
colours associated to data to be protected are defined by user
inputs relative to the data to be protected used at the time of
compilation during the creation of the colour memory.

This feature enables, at the time of the genuine program
compilation, the user to associate particular colour to par-
ticular data. A set of data can thus be chosen by the user to
be protected and the user has the choice of the colour(s), that
can be of any value.

According to an advantageous specific feature of the
invention, said colour memory created at the compilation
time listing the determined memory addresses of the genuine
program with, in addition, an associated colour tag for each
determined addresses where the data to be protected are
stored, said method comprising the step of, for any load
instruction of such data to be protected at the determined
address of the system memory, comparing the colour tag
stored at the loading address in the colour memory and the
colour tag at the load instruction address in the colour
memory.

This specific feature is particularly interesting in genuine
programs where at least a data to be protected is constant or
pre-defined in the genuine program but can be extended to
any data to be protected. In this case there is no need, for a
store instruction, to associate a colour tag to the stored data
at a destination address as the colour tag is already associ-
ated.

According to an advantageous feature of the invention,
data being grouped in contexts, the associated colour tag is
the same for data of a same context The use of a same colour for several data of a same
context enables flexibility in the processing of data. Thus
several data of a same context could be called using a same
instruction while not triggering an alarm.

The triggering of the alarm can also be made diversely
dependent of the detection of discrepancy in the colours.

To the accomplishment of the foregoing and related ends,
one or more embodiments comprise the features hereinafter
fully described and particularly pointed out in the claims.

BRIEF DESCRIPTION OF THE DRAWINGS

The following description and the annexed drawings set
forth in detail certain illustrative aspects and are indicative
of but a few of the various ways in which the principles of
the embodiments may be employed.

Other advantages and novel features will become appar-
ent from the following detailed description when considered
in conjunction with the drawings and the disclosed embodi-
ments are intended to include all such aspects and their
equivalents.

DETAILED DESCRIPTION OF EMBODIMENTS OF THE INVENTION

Figure 1:
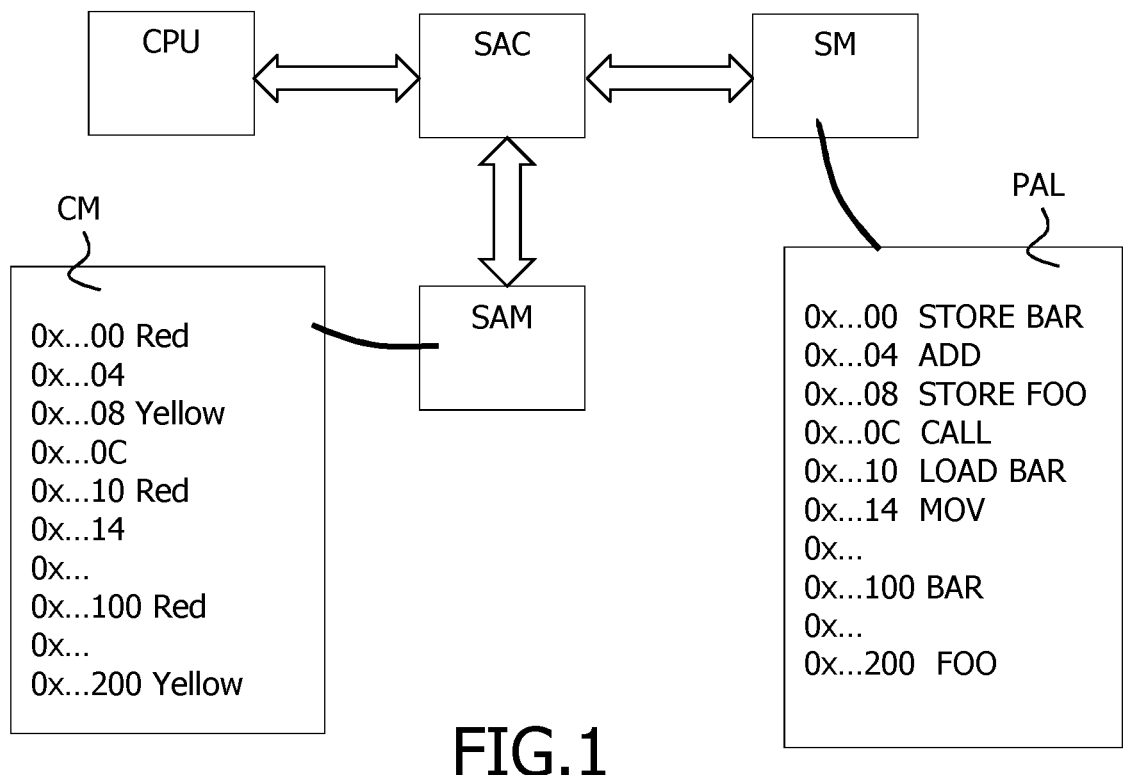
FIG. 1 schematically shows a first implementation of the
invention where an exemplary set of instructions is executed
in a system of the invention.

For a more complete understanding of the invention, the
invention will now be described in detail with reference to
the accompanying drawing. The detailed description will
illustrate and describe what is considered as a preferred
embodiment of the invention. It should of course be under-
stood that various modifications and changes in form or
detail could readily be made without departing from the
scope of the invention. It is therefore intended that the
invention may not be limited to the exact form and detail
shown and described herein, nor to anything less than the
whole of the invention disclosed herein and as claimed
hereinafter. The same elements have been designated with
the same references in the different drawings. For clarity, only those elements and steps which are useful to the understanding of the present invention have been shown in the drawings and will be described.

FIG. 1 schematically shows a first implementation of the invention where an exemplary set of instructions is executed in a system of the invention.

The system is an execution environment composed of a central processing unit CPU and system memory SM to store a genuine program. It is here noted that the program has not been modified according to the invention. It can be any kind of genuine program like an open source program for example, or any certified program, or any program having specific compliance to any rule and that must remain unchanged while needing to improve the security of its execution.

System memory SM, as shown on FIG. 1, can be a system memory or a cache where the program is stored with its variables to be executed in the execution environment as shown on FIG. 1. Indeed the address of the data in the system memory or in the cache are the same. The secure agent component can thus indifferently be connected to the system memory or to a cache. The cache is a memory smaller than the original one. A given location in the cache indeed corresponds to many locations in memory. While a data is stored at a memory address, the cache indeed stores an information to strictly identify the corresponding memory address. The system memory SM can also be a plurality of memories, spread on diverse devices.

In this execution system, the CPU executes code by fetching instructions and reads and writes data from/into memories SM.

The security protection of the invention is inserted in the system by introducing a Secure agent component SAC located between CPU and memories and by storing additional information in memories. This information can be added in memory classically accessible by the CPU, e.g. RAM, NVM or in a dedicated secure agent memory SAM.

There can indeed be as many memories in the secure agent component (or accessible by the secure agent component) as there are memories accessible by the CPU, which are to be colour tagged. Depending on the implementation there can be a single memory gathering all memories to be colour tagged, for example in the secure agent component, or as many memories as memories to be colour tagged.

Also, in an implementation the colour tag is stored in the system memory itself with the data and the set of instructions. In such an implementation, the system memory will store words of, for example, 32+n bits, 32 bits being the ones read by the CPU to execute the program, and n being the number of bits by which the colour tag is identified, those n bits being thus read by the secure agent component SAC. This does not modify the program itself as the CPU only read the first 32 bits (or the 64 bits if the CPU works on such other size of data).

It is here also noted that hybrid implementations where the memories used for the implementation, and thus for the storage of colour tags, are present at various locations in the system can also be implemented according to the invention.

The solution can be applied on all types of CPU Instruction Set Architecture because the register transfer level RTL code impact on the CPU and on the secure agent component SAC is limited.

According to the invention, the secure agent component SAC monitors the accesses occurring between the CPU and memories SM. It can access to the dedicated secure agent memory SAM or to a memory accessible by the CPU that contains the additional data needed for the implementation of the invention. For this purpose, the secure agent component SAC may modify the bus data access.

On FIG. 1, is shown an exemplary part of memory PAL listing addresses where data and instructions of the program to be protected are stored. This part of memory PAL stores some memory access instructions, here store and load instructions, relative to data, FOO and BAR, to be protected using colour tags according to the invention.

In said part of memory PAL is thus stored, or copied in the case where this part of memory is in a cache, a program to be executed by the system of the invention.

In this part of memory PAL, and a set of instructions of the program are stored in addresses 0x . . . 00 to 0x . . . 14, the data BAR is stored at the address 0x . . . 100, and the data FOO is stored at the address 0x . . . 200.

It starts with a memory access instruction STORE stored at the address 0x . . . 00 for the value BAR, then an instruction ADD stored at the address 0x . . . 04, a STORE instruction at the address 0x . . . 08 for the value FOO, a CALL instruction at the address 0x . . . 00, a LOAD instruction at the address 0x . . . 10 for the value BAR and at last a MOV instruction at the address 0x . . . 14. This part of memory PAL corresponds to the compiled program.

At the time of the compilation, in parallel of the compilation of the program, a corresponding colour memory CM is created. This colour memory CM is here shown in a dedicated secure agent memory SAM. It is noted here that it could also be a memory accessible by the secure agent component SAC that contains the additional data needed for the implementation of the invention. The colour memory CM can thus physically be implemented in the system memory SM as discussed above.

The colour memory CM is generated from the program itself and from user inputs tagging the data to be protected. At the time of compilation, each memory access instruction to access data to be protected is associated to a colour tag.

Such a colour tag can be individual for each data to be protected or can be associated to all data of a context to be protected. Such context can be a function, a process or a buffer composed of several data elements to be protected.

Here, at least two variables need to be protected, FOO and BAR. Thus, in the colour memory CM, instructions STORE and LOAD manipulating one or the other of those data are associated with a corresponding colour tag. Here the STORE and LOAD instructions for BAR are tagged with the colour tag Red and the STORE (and LOAD if there was) for FOO are tagged with the Yellow colour tag.

The colour tag is a value coded in bits without correlation with the data itself.

Figure 2A:
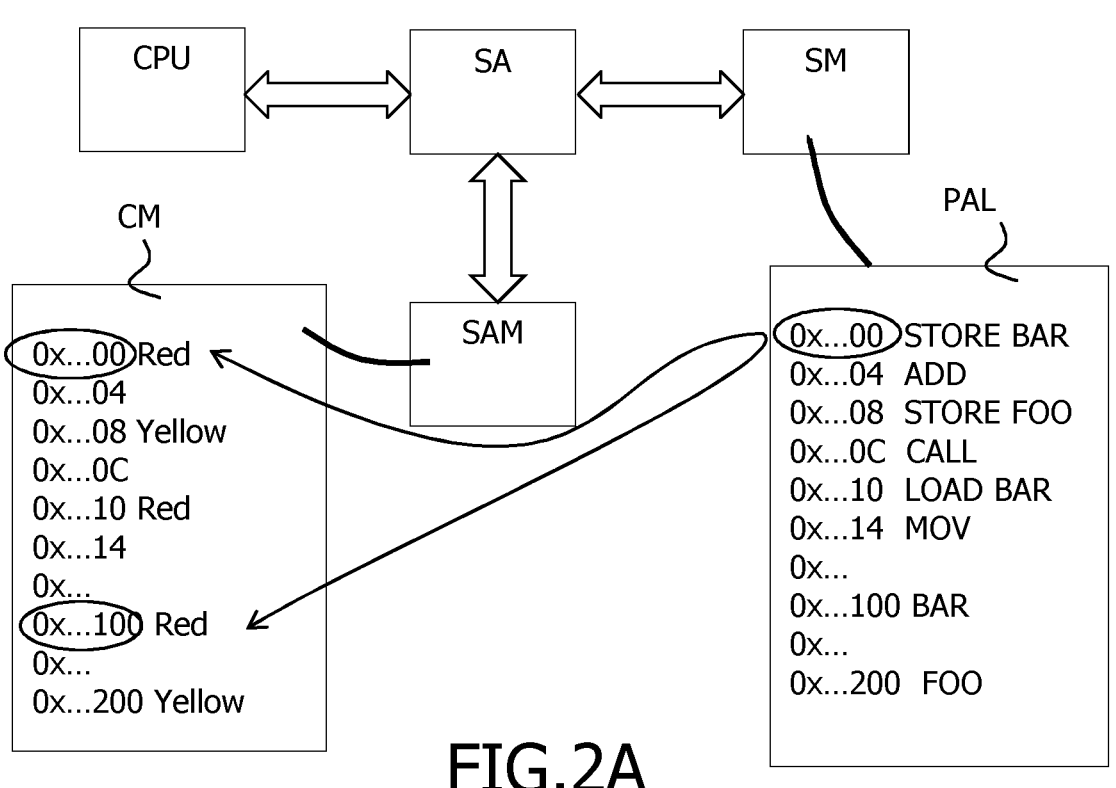
FIGS. 2A, 2B, 2C and 2D illustrate what occurs during
the execution of the exemplary set of instructions in different
situations.
Figure 2B:
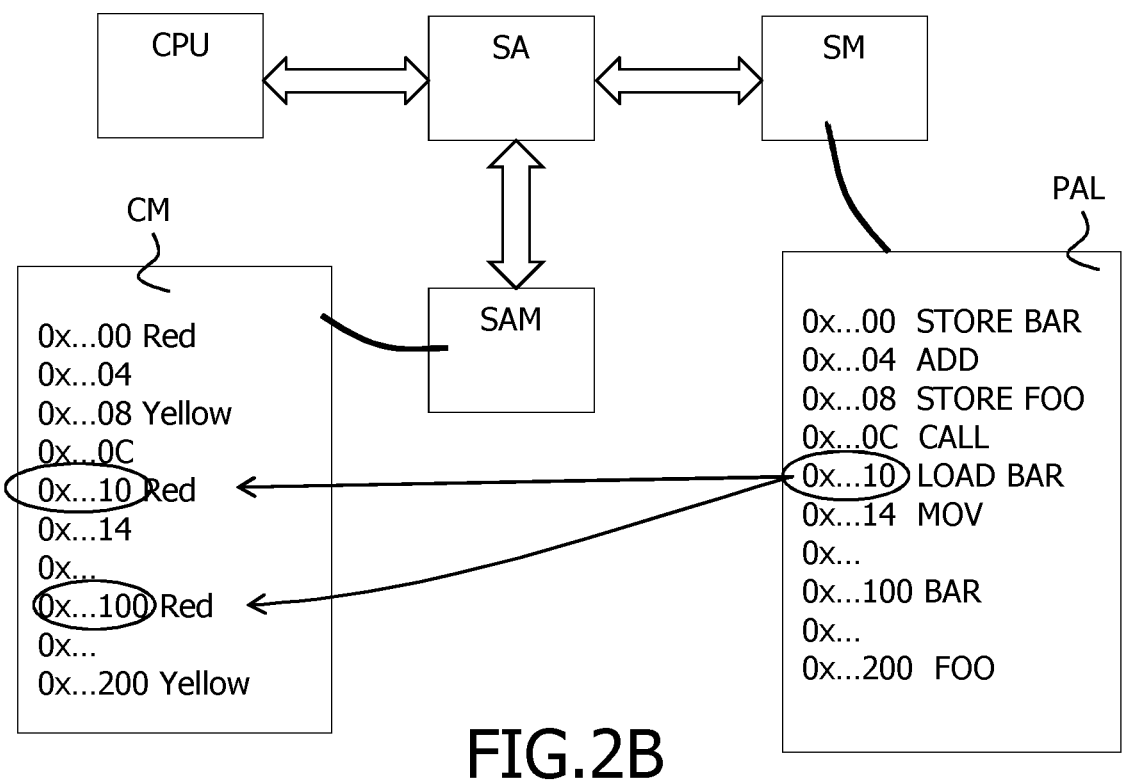
Figure 2C:
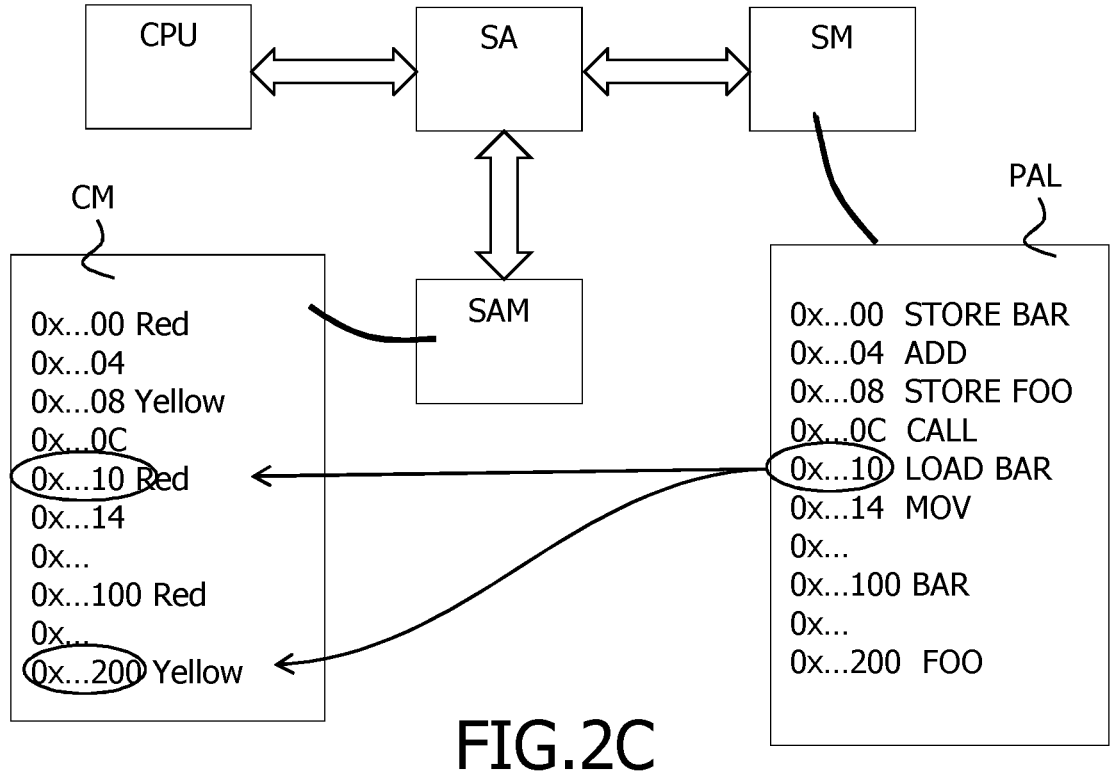

FIGS. 2A, 2B and 2C illustrate what occurs during the execution of the exemplary set of instructions in the program as stored in the part of memory PAL.

As shown on FIG. 2A, STORE BAR at address 0x . . . 00 is thus executed, the secure agent component SAC monitors bus to collect the variable BAR address 0x . . . 100 and write the colour Red in the colour memory CM. Indeed the colour tag, here Red, is the one associated to the currently executed instruction STORE BAR instructions. This colour tag is thus previously read by the secure agent component in the colour memory CM at the address of the instruction STORE BAR, i.e. 0x . . . 00.

Then, the instruction ADD at following address 0x . . . 04 in the program stored in system memory SM, is executed. This instruction does not have any associated colour tag in the colour memory CM. The invention is here inactive.

Then, the instruction STORE FOO is executed. This is not illustrated in figures. While writing the variable FOO at address 0x . . . 200, the secure agent component who fetched this instructions, stores, in the colour memory, the colour tag corresponding to the STORE FOO instruction at address 0x . . . 08, i.e. the Yellow colour tag, at the address of the variable FOO, i.e. 0x . . . 200.

As shown on FIG. 2B, after this, the colour tag Yellow is stored at the address 0x . . . 200 of the variable FOO in the colour memory CM.

Then as illustrated on FIG. 2B, after a CALL instruction at address 0x . . . 0C, a LOAD BAR instruction is performed.

There is here a verification of the colour tag of the instruction and of the variable by the secure agent component. For this, it fetches the instruction, determine the associated colour tag, here Red at address 0x . . . 10, in the colour memory CM and determine also the colour tag associated to the read variable, here Red at address 0x . . . 100. Here the colour tags are identical and the execution of the program can be continued without alarm.

However as illustrated on FIG. 2C, where a fault attack lead to a modified address of the data to be loaded when the instruction LOAD BAR is executed, i.e. 0x . . . 200 instead of 0x . . . 100.

Here the secure agent component SAC determines the colour tag Red for the instruction LOAD BAR and the colour tag Yellow at the address 0x . . . 200 when the data is to be loaded. This discrepancy of colour tag lead to an alarm and/or to an execution abortion.

Figure 2D:
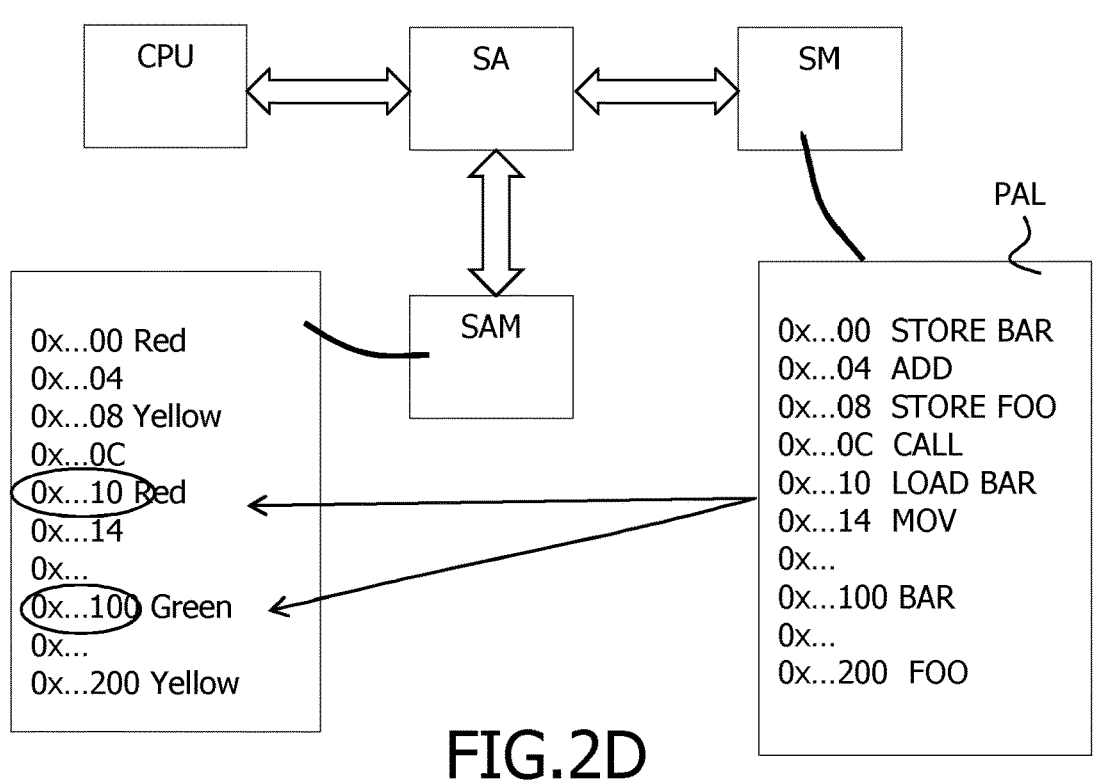

As shown on FIG. 2D, other types of attacks can be identified. If for any reason, there is an unexpected store to 0x . . . 100, for instance due to an attack during the CALL, the data value is modified but also the corresponding colour tag. For example, during this spurious store instruction, the colour tag is set to Green at the address 0x . . . 100. In this case, the secure agent component SAC determines the colour tag Red for the instruction LOAD BAR and the colour tag Green at the address 0x . . . 100 when the data is to be loaded. This discrepancy of colour tag lead to an alarm and/or to an execution abortion.

Figure 3:
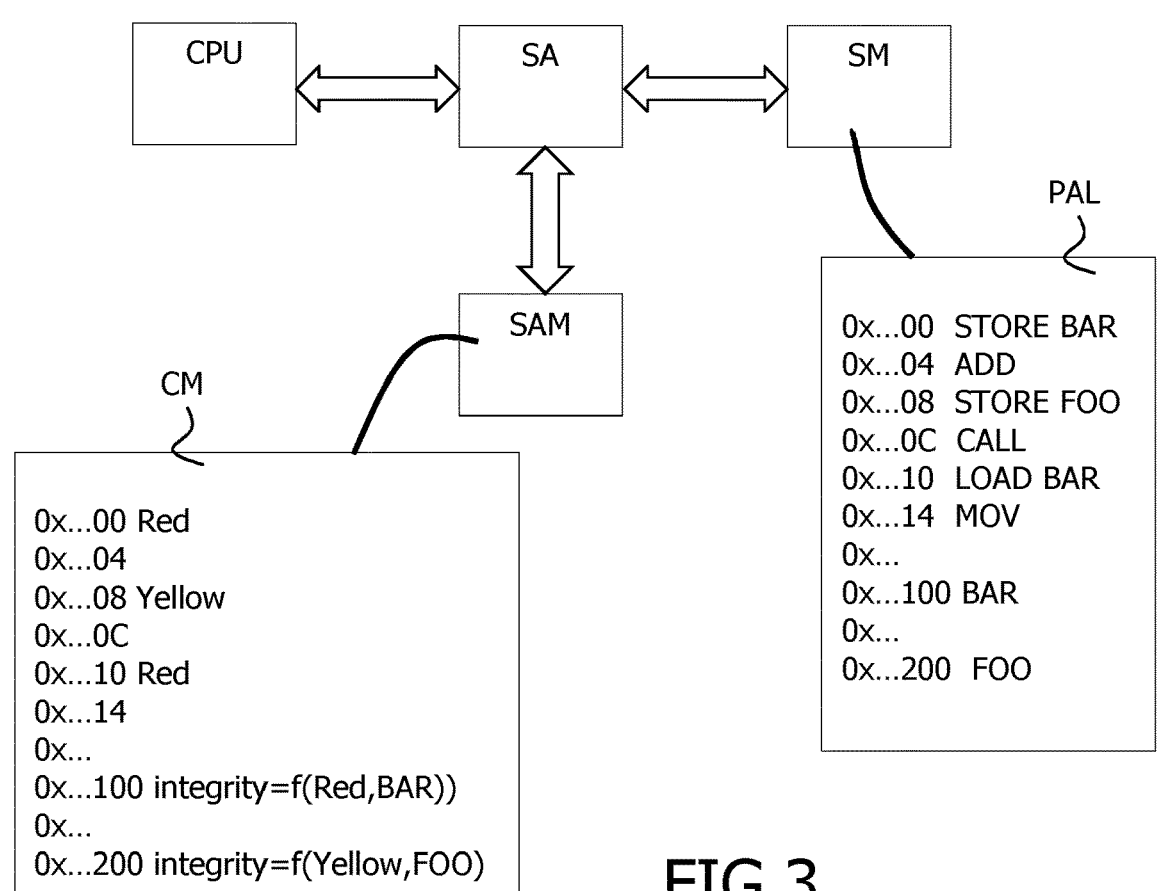
FIG. 3 schematically shows a second implementation of
the invention

FIG. 3 schematically shows a second implementation of the invention where the integrity of the data to be protected is further checked while implementing the invention.

Indeed, in this second implementation, to ensure integrity of stored data, an Integrity tag is used instead of the Colour tag while the colour tag is still used with the instructions.

Two types of tags are then present in the colour memory CM for each memory zone: Coloured integrity tag associated to data/variable to be protected and Colour tag associated to instructions relative to the data/variable to be protected.

The coloured integrity tag is calculated using a function f of the colour and of the variable, typically a signature of the colour and the variable.

In this implementation, when LOAD instructions are fetched from memory, on one hand, the secure agent component SAC loads a coloured integrity tag corresponding to the data and a Colour tag corresponding to the instruction.

When a STORE instruction is fetched from memory, the secure agent component SAC takes the variable and the colour tag of the instruction as stored in the colour memory CM and calculates a coloured integrity tag, typically by calculating the signature f(Colour tag; Variable). This coloured integrity tag is stored as associated to the data/variable in the colour memory CM as shown on FIG. 3.

When a LOAD instruction is fetched, the secure agent component SAC retrieve the variable in the system memory at the right address and the colour tag of the instruction and calculates a coloured integrity tag for the variable, i.e. the signature f(Colour tag; Variable) with the retrieved variable and colour tag.

Then the secure agent component SAC compares this calculated coloured integrity tag with the one stored in the colour memory CM at the address corresponding to the variable. Integrity is thus checked by comparing both data signatures. The combination of the colour with the value of the variable enables to get a data integrity signature and to check the colour together.

According to another implementation, not illustrated in the figures, when the secure agent component SAC fetches a STORE BAR, it then fill the colour memory CM at corresponding address of data BAR 0x100 with a coloured integrity tag f(Red, BAR).

Then, when the secure agent memory SAC fetches a LOAD BAR instruction, the instruction that will be sent to the central processing unit CPU is to read the system memory at address 0x100 where the data BAR is stored. In parallel the colour memory CM is read at address 0x10 to get the colour associated to the instruction, here Red. The secure agent component SAC then calculates the integrity function f(Red, BAR) with the retrieved data BAR and colour of LOAD BAR instruction, here Red. It then reads the colour memory CM at address 0x100 which stores f(Red,BAR) for comparison and triggering of an alarm and/or abortion of the execution.

In the same example, if the CPU executes the "LOAD BAR" instruction to load incorrectly FOO variable, the secure agent component SAC loads the data FOO and the colour Red, which is the colour of the instruction LOAD BAR, from the colour memory CM. The secure agent component SAC then compares integritySignature(Yellow, FOO) as stored for address 0x . . . 200 with the computed signature which is equal to integritySignature(Red, FOO). As the signatures are different, the attack is detected.

It is here further noted that the Colour can be shared with several variables or with a whole buffer. Typically contexts can be defined having a same colour. It explains why a LOAD (or STORE) instruction tagged with a Colour cannot access to other Colour data. Typically, to protect stack, to avoid that code working in a stack frame modifies another stack frame, different Colours are selected for each frame.

If the secure agent component SAC adds Data Integrity Signature to the bus, integrity can be propagated up to the CPU and used within. In that case data length is no more, for instance, 32 bits but 32+n bits. Data integrity can be checked inside CPU. Integrity is then checked end-to-end. The secure agent component SAC has the possibility to associate the colour tag or the coloured integrity tag to the data on the bus. In that case the bus is composed of n extra bits dedicated to code the information. This information can be used by the CPU to check again the integrity for instance.

The invention enables to propose the functionality of colouring data while willing to protect a program. As code needs to be processed and colour tags produced, corresponding tools are proposed to create the colour memory according to the invention at compilation time. The user lists, before compilation, the colours of the data of the program. At compilation time, program source code is compiled and linked. The information resulting from the compilation contains the genuine program and also related compilation and link information. This previous information will be post-processed with the list of colours of data of the program to generate the colours associated to each STORE and LOAD instructions. The post-process step produces the secure agent memory content.

As a conclusion, the invention protects the data by supporting the following functionalities:

address range checking by prohibiting the data read/write access outside the allowed address zone, such a situation being detected by a discrepancy in colours memory data integrity by generating and checking the integrity of the data stored in memory, central processing unit data integrity by generating and checking the integrity of the data inside central processing unit: register file, internal registers, buses . . .

end-to-end data integrity when memory and central processing unit data integrity are implemented.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. An execution system having at least a central processing unit (CPU), a system memory (SM) storing a genuine program having instructions at determined addresses and a secure agent component (SAC) dedicated to the protection of the execution of the genuine program and fetching instructions occurring between the central processing unit (CPU) and system memory (SM), said secure agent component (SAC) comprising a colour memory (CM) created at the compilation time of the genuine program from the genuine program source and data to be protected, said colour memory (CM) is configured to list the determined memory addresses of the genuine program with, at least, an associated colour tag for each store and load instruction relative to data to be protected, said secure agent component (SAC) is configured to:

store instruction of a data to be protected at a destination address of the system memory (SM), associate the colour tag stored at the store instruction address in the colour memory (CM) to the destination address in the colour memory (CM) while storing data at the destination address in the system memory (SM) by:

retrieving the colour tag stored at the store instruction address in the colour memory (CM), calculating an integrity function of the retrieved colour tag and of the data to be stored according to the store instruction as a coloured integrity tag, storing the thus calculated coloured integrity tag at the destination address in the colour memory (CM) while storing the data at the destination address in the system memory (SM), the association of the colour tag with the data to be protected realized through the thus calculated and stored coloured integrity tag, said secure agent component (SAC) is configured to, for a load instruction of data at a loading address of the system memory;

compare the colour tag associated to the loading address in the colour memory (CM) and the colour tag at the load instruction address in the colour memory (CM) by:

retrieving the colour tag stored at the load instruction address in the colour memory (CM), calculating an integrity function of the thus retrieved colour tag and of the data to be loaded according to the load instruction as a coloured integrity tag, the comparison performed by a comparator, said secure agent component (SAC) being configured to abort the execution of the genuine program if the comparator indicates that the compared colour tags are different.

2. The execution system according to claim 1, wherein the colours associated to data to be protected have been defined by user inputs relative to the data to be protected used at the time of compilation during the creation of the colour memory (CM).

3. The execution system according to claim 1, wherein, said colour memory (CM) is configured to create at the compilation time listing the determined memory addresses of the genuine program with, in addition, an associated colour tag for each determined addresses where the data to be protected are stored, said execution system such that for any load instruction of data to be protected at the determined address of the system memory (SM), said execution system is configured for comparing the colour tag stored at the loading address in the colour memory (CM) and the colour tag at the load instruction address in the colour memory (CM).

4. The execution system according to claim 3, wherein data when grouped in contexts, the associated colour tag is the same for data of a same context.

5. A method to protect the execution of a genuine program having instructions stored in a system memory (SM) at determined addresses, said genuine program to be executed by a central processing unit (CPU) using said system memory (SM), said method implemented, independently of the execution of the genuine program, by a secure agent component (SAC) inserted between the system memory (SM) and the central processing unit (CPU), said secure agent component (SAC) comprising a colour memory (CM) created at the compilation time of the genuine program from the genuine program source and from data to be protected, said colour memory (CM) listing the determined memory addresses of the genuine program with, at least, an associated colour tag for each store and load instruction relative to data to be protected, the method to protect the execution of the program comprising the steps of:

fetching instructions between the central processing unit (CPU) and the system memory (SM) by the secure agent component (SAC), during the execution of the genuine program by the central processing unit (CPU), for a store instruction of a data to be protected at a destination address of the system memory (SM):

associating the colour tag stored at the store instruction address in the colour memory (CM) to the destination address in the colour memory (CM) while storing data to the destination address in the system memory (SM) by:

retrieving the colour tag stored at the store instruction address in the colour memory (CM), calculating an integrity function of the retrieved colour tag and of the data to be stored according to the store instruction as a coloured integrity tag, storing the thus calculated coloured integrity tag at the destination address in the colour memory (CM) while storing the data at the destination address in the system memory (SM), and, for loading a data to be protected at a loading address of the system memory (SM):

comparing the colour tag associated to the loading address in the colour memory (CM) with the colour tag associated to the load instruction address in the colour memory (CM) by:

retrieving the colour tag stored at the load instruction address in the colour memory (CM), calculating an integrity function of the thus retrieved colour tag and of the data to be loaded according to the load instruction as a coloured integrity tag, comparing the thus calculated coloured integrity tag with the coloured integrity tag as stored at the loading address in the colour memory (CM), and, in case those compared colour tags are different, abort the execution of the genuine program.

6. The method according to claim 5, wherein the colour associated to data to be protected are defined by user inputs relative to the data to be protected used at the time of compilation during the creation of the colour memory (CM).

7. The method according to claim 5, wherein, said colour memory (CM) created at the compilation time listing the determined memory addresses of the genuine program with, in addition, an associated colour tag for each determined addresses where the data to be protected are stored, said method comprising the step of, for any load instruction of such data to be protected at the determined address of the system memory (SM), comparing the colour tag stored at the loading address in the colour memory (CM) and the colour tag at the load instruction address in the colour memory (CM).

8. The method according to claim 7, wherein data when grouped in contexts, the associated colour tag is the same for data of a same context.

\* \* \* \* \*